United States Patent [19]
Weber et al.

[11] Patent Number: 6,004,523
[45] Date of Patent: Dec. 21, 1999

[54] PROCESS FOR ABATING $NO_x$ EMISSIONS FROM A MANUFACTURING STREAM

[75] Inventors: George Martin Weber, Chester; Eric Douglas Patterson, Colonial Heights; Herbert Kuchong Chen, Richmond, all of Va.

[73] Assignee: AlliedSignal Inc., Morristown, N.J.

[21] Appl. No.: 08/960,895

[22] Filed: Oct. 30, 1997

[51] Int. Cl.$^6$ ............................ B01D 53/56; C01B 21/50
[52] U.S. Cl. ............................................ 423/235; 423/385
[58] Field of Search ........................ 423/243.08, 243.06, 423/243.01, 235, 396, 545, 385

[56] References Cited

U.S. PATENT DOCUMENTS

| | | | |
|---|---|---|---|
| 1,070,070 | 8/1913 | Rothe | 423/385 |
| 2,805,123 | 9/1957 | Bostian | 423/385 |
| 4,045,540 | 8/1977 | Hertzog | 423/385 |
| 4,233,279 | 11/1980 | Balint et al. | 423/385 |
| 4,996,036 | 2/1991 | Fisher et al. | 423/388 |
| 5,401,480 | 3/1995 | Johnson | 423/243.06 |
| 5,683,666 | 11/1997 | Berisko | 423/243.08 |
| 5,827,488 | 10/1998 | Babu et al. | 423/235 |
| 5,846,286 | 12/1998 | Tseng | 71/58 |

FOREIGN PATENT DOCUMENTS

| | | | |
|---|---|---|---|
| 542615 | 6/1957 | Canada | 423/385 |
| 28 13 520 A1 | 10/1978 | Germany | 423/385 |
| 0 154 166 | 3/1982 | Germany | 423/385 |
| 45-22812 | 8/1970 | Japan | 423/385 |
| 51-70182 | 6/1976 | Japan | 423/235 |
| 53-11163 | 2/1978 | Japan | 423/235 |
| 611879 | 6/1978 | U.S.S.R. | 423/385 |
| 1042176 | 9/1966 | United Kingdom | 423/385 |

OTHER PUBLICATIONS

Kirk–Othmer, "Encyclopedia of Chemical Technology," vol. 22, (1997) pp. 383–393 no month John Wiley and Sons N.Y. USA ISBN 0471–52691–6 (v.22).

Kirk–Othmer, "Encyclopedia of Chemical Technology", vol. 17, (1996) 99. 80–107 no month John Wiley and Sons N.Y. ISBN 0–471–52686–X.

Kirk–Othmer, "Encyclopedia of Chemical Technology", vol. 17, (1996) pp. 93–94 No Month John Wiley and Sons N.Y. U. S. A. ISBN 0–471–52686–X.

Kirk–Othmer, "Encyclopedia of Chemical Technology", vol. 22, (1997) pp. 383–393 No Month John Wiley and Sons N.Y. U. S. A. ISBN 0471–52691–6 (v. 22).

Fortschr. Chem. Forsch. 4, (1963), pp. 301–332 (No Month) "Chemie Der Raschigschen Hydroxylamin–Synthese und IHRER Folgereaktioner" by F. Seel.

*Primary Examiner*—Gary P. Straub
*Assistant Examiner*—Timothy C Vanoy
*Attorney, Agent, or Firm*—Melanie L. Brown; Virginia S. Andrews; Roger H. Criss

[57] ABSTRACT

The present invention provides a process for abating emissions from a manufacturing stream comprising the steps of:
(a) from the manufacturing stream, feeding the emissions comprising $NO_x$ to a scrubbing reactor;
(b) to the emissions in the scrubbing reactor, adding alkali solution and $NO_2$ in an amount sufficient so that a substantial amount of the $NO_x$ forms ammonium nitrite or ammonium nitrate while maintaining the pH of the formed ammonium nitrite solution at greater than about 7.5 and vent gas comprising mist exits from the scrubbing reactor;
(c) maintaining the temperature of the vent gas at less than about 40° C.; and
(d) removing the mist from the vent gas.

13 Claims, 1 Drawing Sheet

PROCESS FOR ABATING $NO_x$ EMISSIONS FROM A MANUFACTURING STREAM

BACKGROUND OF THE INVENTION

Many manufacturing processes including those for the production of nitric acid, sodium nitrate, or hydroxylamine disulfonate diammonium salt result in emissions which may include $NO_x$ (where x=1 or 2), $SO_2$, and mist. Kirk-Othmer, "Encyclopedia of Chemical Technology", Volume 17, pages 93–94 (1996) teaches processes for making nitric acid and three methods for abating $NO_x$ emissions in nitric acid production to an acceptable level for discharge to the atmosphere. The three methods include extended absorption (reaction of nitrogen oxides with water to form acid), selective catalytic abatement (catalyst and ammonia fuel selectively reduce nitrogen oxides in preference to combustion), and nonselective abatement (catalyst and propane or natural gas reduce nitrogen oxides to nitrogen).

Kirk-Othmer, "Encyclopedia of Chemical Technology", Volume 22, pages 383–393 (1997) teaches processes for making sodium nitrate.

Hydroxylamine is widely useful in the transformation of organic compounds to derivatives, which in turn may be intermediates in pharmaceutical or industrial synthesis of other complex molecules. An important use of hydroxylamine is captively in the synthesis of caprolactam which may then be polymerized to polycaprolactam.

The classical method for the production of hydroxylamine is that ascribed to Raschig. An important commercial process consists of the reduction of ammonium nitrite with ammonium bisulfite and sulfur dioxide to give hydroxylamine disulfonate diammonium salt. Upon hydrolysis, hydroxylamine disulfonate diammonium salt gives hydroxylamine sulfate, an intermediate in the production of caprolactam. The overall reaction for production of hydroxylamine disulfonate diammonium salt is (1) $NH_4NO_2 + NH_4HSO_3 + SO_2 \rightarrow HO\text{—}N\text{—}(SO_3NH_4)_2$ where (2) $NH_4OH + SO_2 \rightarrow NH_4HSO_3$ In commercial practice, the reaction is conducted in a packed tower or column where a solution of the reactants is recirculated, an aqueous nitrite solution is fed to the recirculating reactant stream, and supplemental ammonia, such as ammonium hydroxide or ammonium carbonate, is added in an amount to satisfy the stoichiometric requirements $NO_2^-:NH_4^+=1:2$ and $SO_2\uparrow$, obtained for example by the combustion of sulfur with air, is fed at the bottom of the packed column and is vigorously contacted with the liquid in the packed section of the tower. The amount of $SO_2$ fed to the tower should also satisfy the requirements of equation (1) above and the three reactants should therefore be fed in the molar proportions $NO_2^-:NH_4^+SO_2=1:2:2$.

The reaction is complex, with the possibility of many side reactions which have been discussed authoritatively in a review by F. Seel, Fortschr. Chem. Forsch. 4, 301–332 (1963). Side reactions do occur and as a result, $NO_x$ gases, predominantly NO, are released. When the reaction is carried out at lower temperatures, yields of hydroxylamine disulfonate diammonium salt are improved and the extent to which side reactions occur and $NO_x$ are formed is decreased. But even at 0° C., a temperature which is expensive to maintain, $NO_x$ emissions, primarily NO, still constitute up to 3,000 volume ppm in the vent gas.

A known process for abating $NO_x$ emissions is taught by commonly assigned U.S. Pat. No. 4,996,036. The process treats emission gases from the production of hydroxylamine disulfonate diammonium salt and comprises adding $NO_2$ to the emission gases and contacting the mixture of $NO_2$ and emission gases with an aqueous alkali solution sufficiently to form nitrite and nitrate ions in the alkali solution. Unfortunately, this patent illustrates a lab scale process which was operated for only four hours and not in a continuous manner. When we tried to scale up the process taught by the patent and then operate a continuous process, the result was unsatisfactory.

Thus, a need exists in the industry for an improved emission abatement process which is of commercial scale and operated continuously.

SUMMARY OF THE INVENTION

We have developed a process for abating emissions from a manufacturing stream which responds to the foregoing need in the art. The process comprises the steps of:

(a) from the manufacturing stream, feeding the emissions comprising $NO_x$ to a scrubbing reactor;

(b) to the emissions in the scrubbing reactor, adding alkali solution and $NO_2$ in an amount sufficient so that a substantial amount of the $NO_x$ forms ammonium nitrite or ammonium nitrate while maintaining the pH of the formed ammonium nitrite solution at greater than about 7.5 and vent gas comprising mist exits from the scrubbing reactor;

(c) maintaining the temperature of the vent gas at less than about 40° C.; and (d) removing the mist from the vent gas.

The present invention also provides a process for abating emissions from a manufacturing stream wherein the emissions comprise $NO_x$, $SO_2$, and mist. The process comprises the steps of:

(a) from the manufacturing stream, feeding the emissions to a scrubbing reactor; and (b) to the emissions in the scrubbing reactor, adding alkali solution and $NO_2$ in an amount sufficient so that a substantial amount of the $NO_x$ forms ammonium nitrite or ammonium nitrate and a substantial amount of said $SO_2$ forms ammonium sulfite or ammonium sulfate while maintaining the pH of the formed ammonium nitrite solution at greater than about 7.5 and vent gas comprising mist exits from the scrubbing reactor; and (c) maintaining the temperature of the vent gas at less than about 40° C. Preferably, step (d) is removing mist from the vent gas.

The present invention is advantageous because the process reduces emissions of both $NO_x$ and $SO_2$ while turning these gases into usable or saleable products.

Other advantages of the present invention will be apparent from the following description, attached drawing, and attached claims.

BRIEF DESCRIPTION OF THE DRAWINGS

The FIGURE illustrates the present process for abating emissions from the production of hydroxylamine disulfonate diammonium salt.

DETAILED DESCRIPTION OF THE PREFERRED EMBODIMENTS

Figure 1:
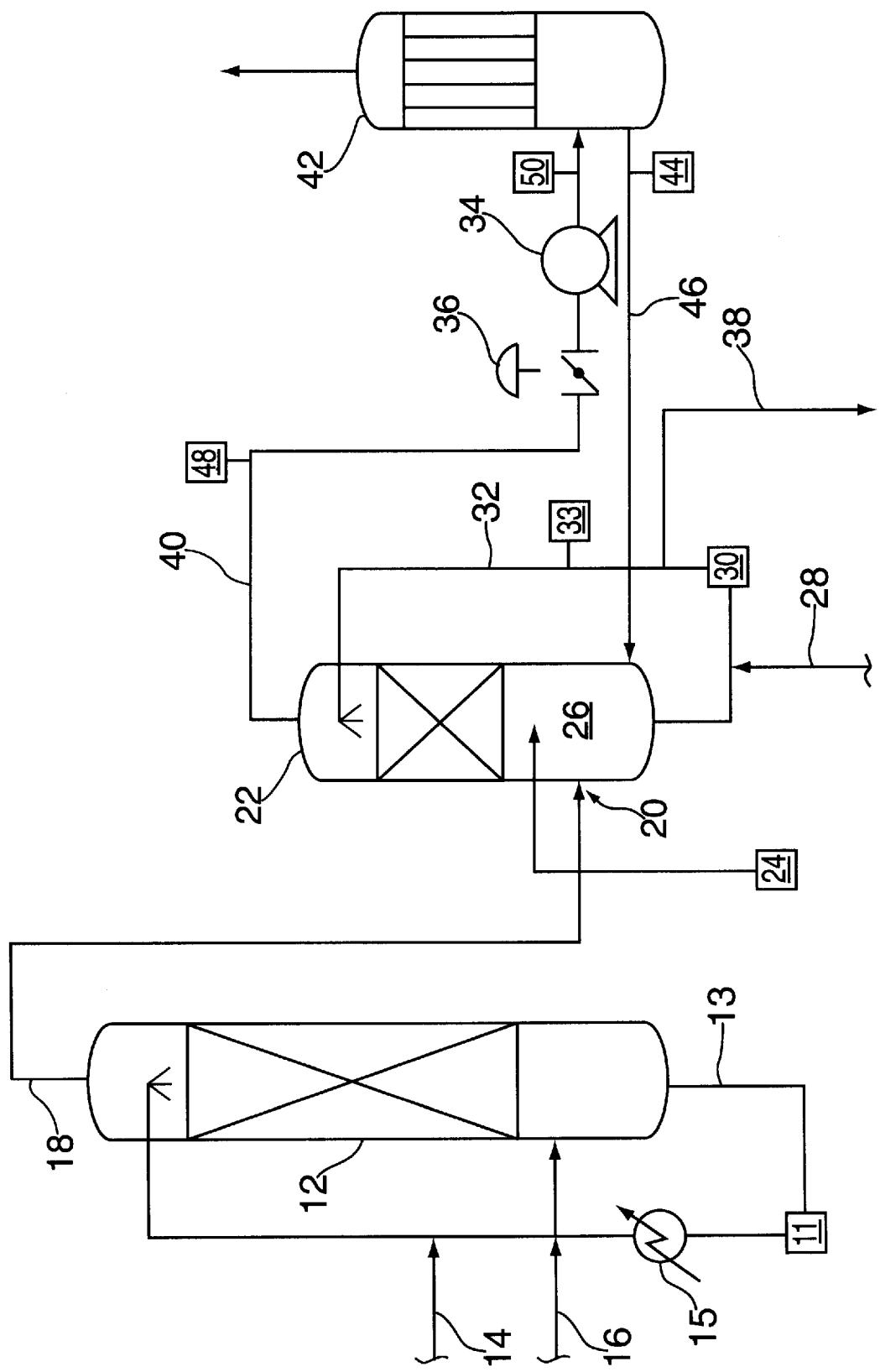

Step (a) of the present process comprises from the manufacturing stream, feeding the emissions comprising $NO_x$ to a scrubbing reactor. Preferred manufacturing streams comprises those resulting from the production of nitric acid, sodium nitrate, or hydroxylamine disulfonate diammonium salt. Useful processes for the production of nitric acid are taught by Kirk-Othmer, "Encyclopedia of Chemical Technology", Volume 17, pages 80–107 (1996). Useful processes for the production of sodium nitrate are taught by Kirk-Othmer, "Encyclopedia of Chemical Technology", Volume 22, pages 383–393 (1997).

Any known process for the production of hydroxylamine disulfonate diammonium salt may be used. A preferred process for the production of hydroxylamine disulfonate diammonium salt comprises using a packed column 12 to provide the appropriate packing to ensure sufficient contact of the ammonium nitrite solution feed 14 including ammonium carbonate and ammonium bicarbonate with $SO_2\uparrow$ feed 16. The $SO_2\uparrow$ feed 16 reacts with the ammonium carbonate or ammonium bicarbonate to form ammonium bisulfite which reacts with ammonium nitrite to obtain the desired hydroxylamine disulfonate diammonium salt. To improve yields and therefore, reduce the extent to which side reactions occur and $NO_x$ is formed, recirculation of a portion of hydroxylamine disulfonate diammonium salt product solution is recirculated by pump 11 from exit 13 through heat exchanger 15 to the top of packed column 12 to operate the column preferably at a temperature less than 20° C., and more preferably lower. Nevertheless, emission gases exit through outlet 18 and contain up to about 3000 volume parts per million (ppm) $NO_x$, primarily NO, and small quantities of $SO_2$, for example up to 200 ppm. The emission gases flow through entrance 20 into scrubbing reactor 22. A commercially available scrubbing reactor may be used.

Step (b) comprises to the emissions in the scrubbing reactor, adding alkali solution and $NO_2$ in an amount sufficient so that a substantial amount of the $NO_x$ forms ammonium nitrite or ammonium nitrate while maintaining the pH of the formed ammonium nitrite solution at greater than about 7.5 and vent gas comprising mist exits from the scrubbing reactor.

We have found that the pH of the formed ammonium nitrite solution should be greater than about 7.5 so as to maintain the stability of the ammonium nitrite; otherwise, the ammonium nitrite in aqueous solution may decompose at uncontrollable rates to $NO_2$ and NO with potentially catastrophic results. Because the Examples of commonly assigned U.S. Pat. No. 4,996,036 illustrate only a lab scale process which was not operated in a continuous manner, the reference does not recognize or appreciate that the system's pH decreases over time. Thus, the reference does not teach or suggest controlling the pH of the formed ammonium nitrite solution or the requirement for replenishment of alkali solution in order to maintain the system's pH.

Preferably, the pH is measured continuously using commercially available pH probes on both the alkali recirculation line of the scrubbing reactor 22 and the mist removal unit drain system. Preferably, the pH of the formed ammonium nitrite solution is maintained at greater than about 8.0. More preferably, the pH of the formed ammonium nitrite solution is maintained at greater than about 8.5.

Step (c) comprises maintaining the temperature of the vent gas at less than about 40° C. We have found that the temperature of the vent gas must be maintained at less than about 40° C. Otherwise, dry ammonium nitrite is known to explode above 40° C. Preferably, the temperature of the vent gas is monitored in at least two locations by using commercially available temperature switches. Although the Examples of commonly assigned U.S. Pat. No. 4,996,036 teach that the hydroxylamine disulfonate diammonium salt tower is operated at 10° C. and in the scrubber the circulating ammonium carbonate solution is maintained at 12° C., the reference does not teach or suggest maintaining the temperature of the vent gas at less than about 40° C.

Preferably, the temperature of the vent gas is maintained at less than about 35° and more preferably, the temperature of the vent gas is maintained at less than about 30° C.

The phrase "substantial amount of $NO_x$ forms ammonium nitrite or ammonium nitrate" as used herein means at least about 50 weight percent of $NO_x$ forms ammonium nitrite or ammonium nitrate. Preferably, at least about 60 weight percent of $NO_x$ forms ammonium nitrite or ammonium nitrate. More preferably, at least about 70 weight percent of $NO_x$ forms ammonium nitrite or ammonium nitrate. We believe that the following reactions occur in step (b):

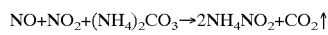

$$NO+NO_2+(NH_4)_2CO_3 \rightarrow 2NH_4NO_2+CO_2\uparrow$$

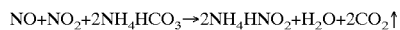

$$NO+NO_2+2NH_4HCO_3 \rightarrow 2NH_4HNO_2+H_2O+2CO_2\uparrow$$

In a preferred process, the process for abating emissions from a manufacturing stream treats emissions comprising $NO_x$, $SO_2$, and mist. Step (a) of this process is comparable to that set forth above for treating $NO_x$ emissions alone. Although commonly assigned U.S. Pat. No. 4,996,036 acknowledges that $SO_2$ is present in emissions from the production of hydroxylamine disulfonate diammonium salt, the reference is silent as to a process for abating these $SO_2$ emissions. Step (b) comprises to the emissions in the scrubbing reactor, adding alkali solution and $NO_2$ in an amount sufficient so that a substantial amount of the $NO_x$ forms ammonium nitrite or ammonium nitrate and a substantial amount of the $SO_2$ forms ammonium sulfite or ammonium sulfate while maintaining the pH of the formed ammonium nitrite solution at greater than about 7.5 and vent gas comprising mist exits from the scrubbing reactor. Step (c) comprises maintaining the temperature of the vent gas at less than about 40° C.

The phrase "substantial amount of $SO_2$ forms ammonium sulfite or ammonium sulfate" as used herein means at least about 70 weight percent of $SO_2$ forms ammonium sulfite or ammonium sulfate. Preferably, at least about 80 weight percent of $SO_2$ forms ammonium sulfite or ammonium sulfate and more preferably, at least about 90 weight percent of $SO_2$ forms ammonium sulfite or ammonium sulfate. We believe that the following reactions occur in step (b):

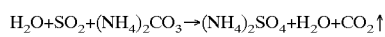

$$H_2O+SO_2+(NH_4)_2CO_3 \rightarrow (NH_4)_2SO_4+H_2O+CO_2\uparrow$$

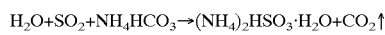

$$H_2O+SO_2+NH_4HCO_3 \rightarrow (NH_4)_2HSO_3 \cdot H_2O+CO_2\uparrow$$

The amount of time during which the emissions and $NO_2$ are in contact with the alkali solution in the scrubbing reactor impact the $NO_x$ amount which is converted to ammonium nitrite or ammonium nitrate. As contact time increases, conversion of $NO_x$ to ammonium nitrite or ammonium nitrate increases.

In the FIGURE, $NO_2$ gas from a source 24 is added to the emission gases by using a commercially available sparger 26 to distribute the $NO_2$ gas. The use of the sparger maximizes contact between $NO_2$ and the NO in the emission gases and minimizes contact with other added $NO_2$ and thus, minimizes undesirable reactions and products. As a source of $NO_2$, gases obtained by the combustion of ammonia with air over a catalyst and containing 10% NO may be used after sufficient residence time for NO oxidation to $NO_2$ by the $O_2$ present in the mixture in a reactor.

Efficiency of removal of NO from the hydroxylamine disulfonate diammonium salt reaction vent gases has been found to depend on the ratio of $NO_2$ added to NO present. Effective removal is obtained with a ratio of $NO_2$:NO of from about 1:1 to about 2:1. It is possible to reduce the concentration of $NO_x$ in the emission gas to less than 600 ppm. $NO_2$ is added via flow control to maximize $NO_x$ reduction. Addition rate is limited because adding too much $NO_2$ will cause the vent gas plume to become reddish-brown in color.

The mixture of emission gas containing NO and the added $NO_2$ is combined in the scrubbing reactor 22 for contact with alkali. In the FIGURE, the alkali solution from supply 28 may be pumped by pump 30 through line 32 to the top of scrubbing reactor 22 and thus, the alkali solution is recirculated within the scrubbing reactor. Preferably, a pH probe 33 is continuously measuring the pH in the alkali recirculation line 32. If the measured pH is too low, the pH is increased by adding more fresh alkali solution through line 28. Because the preferred process for the production of hydroxylamine disulfonate diammonium salt operates at near atmospheric pressure, blower 34 provides a motive force which moves the mixture of emission gas containing NO and the added $NO_2$ through the scrubbing reactor 22. Throttling valve 36 controls the flow of vent gas through the system. The recirculating carbonate/nitrite/sulfite liquid is purged from scrubbing reactor 22 at exit 38. This purged carbonate/nitrite/sulfite liquid may be fed to other operations to utilize the chemicals as intermediates or to recover them as saleable products.

Useful alkali for the alkali solution include earth alkali metal hydroxides, oxides, carbonates, and bicarbonates, and alkali metal hydroxides, carbonates, and bicarbonates. Examples include ammonium hydroxide, ammonium bicarbonate, ammonium carbonate, sodium hydroxide, sodium bicarbonate, sodium carbonate, and calcium hydroxide.

Step (d) comprises removing the mist from the vent gas. The term "mist" as used herein means very small droplets of aqueous salt solution. Preferably, the mist droplets range from submicron to about 10 microns in size. Although commonly assigned U.S. Pat. No. 4,996,036 discusses that a mist is often found at the entrance to the scrubbing reactor and indicates that a venturi jet may be used as a gas/liquid contacting device which eliminates the mist, the reference does not teach, recognize, or appreciate that mist also forms in the scrubbing reactor and thus, does not teach or suggest the removal of such mist formed in the scrubbing reactor. The amount of particulates in the mist is typically measured by collecting a sample of vent gas and evaporating off the water. The remaining solids are weighed to determine the particulate amount present.

As shown in the FIGURE, vent gas 40 exits scrubbing reactor 22 and enters mist removal unit 42. The preferred mist removal unit 42 is commercially available and has candle style mist removal elements in which the candles are irrigated on a timed basis with an alkali solution to control solids build-up and maintain an alkaline environment. Preferably, a pH probe 44 is continuously measuring the pH in stream 46 from mist removal unit 42. Preferably, a temperature switch 48 is continuously measuring the temperature of vent gas 40 exiting scrubbing reactor 22 and a temperature switch 50 is continuously measuring the temperature of vent gas 40 prior to its entry into the mist removal unit 42. If the measured temperature exceeds about 38° C., the hydroxylamine disulfonate diammonium salt production unit is shut down until the problem is corrected.

The formed ammonium nitrite and ammonium sulfite may be used as intermediate chemicals since they are unstable and will eventually break down into ammonium nitrate and ammonium sulfate respectively. Ammonium nitrite may be used as a feedstock for the production of hydroxylamine disulfonate diammonium salt. The formed ammonium nitrate and ammonium sulfate may be recovered and sold as fertilizers.

Inventive Example 1

With reference to the FIGURE, approximately 900,000 cubic feet per hour ("cfh") of emissions from the hydroxylamine disulfonate diammonium salt process was fed continuously to scrubbing reactor 22. The emissions had approximately 2,000 ppm $NO_x$ and 100+ ppm $SO_2$. Approximately 25,000 cubic feet per hour of $NO_2$ supplied from the oxidation of ammonia with air and which contains about 10 percent $NO_2$ from source 24 was injected through sparger 26 into scrubbing reactor 22. The packed scrubbing reactor 22 was 12 feet in diameter and approximately 35 feet tall. The vent gas temperature was monitored by temperature switch 48 in the scrubbing reactor discharge line and by temperature switch 50 in the blower discharge line to confirm a temperature of less than 40° C. above which point solid ammonium nitrite could explode.

Prior to start-up, the scrubbing reactor sump was filled using the fresh feed line from supply 28. In scrubbing reactor 22, the gases were contacted with approximately 1000 gallons of a recirculating solution of ammonium carbonate and ammonium bicarbonate. Fresh alkali solution was added from supply 28 at a rate of less than 30 gallons per minute and simultaneously a constant purge through exit 38 occurred in order to maintain the alkali volume. The pH of the formed ammonium nitrite solution was monitored by using pH probe 33 in scrubbing reactor recirculation line 32 and by using pH probe 44 in the mist removal unit drain line 46 and maintained these at a pH of about 8.5. The amount of time during which the vent gas and $NO_2$ mixture was in contact with the alkali solution was about three seconds. Emissions of $NO_x$ in the vent gas 40 averaged 1,000 ppm and $SO_2$ emissions averaged 5 ppm. Concentrations in the scrubbing liquid averaged 5 weight percent ammonium nitrite and 2 weight percent ammonium sulfite. Mist emissions from the mist removal unit 42 were less than 0.005 grains/dry standard cubic foot. These results are in the Table below.

Inventive Example 2

Inventive Example 1 was repeated except that the contact time was four seconds and 30,000 cubic feet per hour of $NO_2$ supplied from the oxidation of ammonia with air and which contains about 10 percent $NO_2$ was added. The resulting $NO_x$ in the vent gas shows that increasing both the contact time and $NO_2$ addition provided increased $NO_x$ removal. The results are in the Table below.

|  | Inventive Example 1 | Inventive Example 2 |
| --- | --- | --- |
| $NO_x$ emissions (volume ppm) | 2,000 | 2,000 |
| $SO_2$ emissions (volume ppm) | 100+ | 100+ |
| Contact time (sec) | 3 | 4 |
| $NO_2$ added (cubic feet per hour) | 25,000 | 30,000 |
| pH of formed ammonium nitrite | 8.5 | 8.5 |
| temperature of vent | 20 | 20 |

-continued

|  | Inventive Example 1 | Inventive Example 2 |
|---|---|---|
| gas (° C.) | | |
| $NO_x$ vent gas (volume ppm) | 1,000 | 600 |
| $SO_2$ vent gas (volume ppm) | 5 | 5 |
| $NO_x$ removed (%) | 50 | 70 |
| $SO_2$ removed (%) | 95+ | 95+ |
| scrubbing liquid ammonium nitrite (weight %) | 5 | 5 |
| scrubbing liquid ammonium sulfite (weight %) | 1 | 1 |

What is claimed is:

1. A continuous process for abating emissions from a manufacturing stream comprising the steps of:

(a) from said manufacturing stream comprising those resulting from production of nitric acid, sodium nitrate, or hydroxylamine disulfonate diammonium salt, feeding said emissions comprising $NO_x$ said $NO_x$ is predominantly NO to a scrubbing reactor;

(b) to said emissions in said scrubbing reactor, adding alkali solution selected from the group consisting of ammonium hydroxide, ammonium bicarbonate, and ammonium carbonate, and $NO_2$ to adjust the ratio of $NO_2$ to NO to between about 1:1 to 2:1 and in an amount sufficient so that a substantial amount of said $NO_x$ forms ammonium nitrite while maintaining the pH of said formed ammonium nitrite solution at greater than about 7.5 so as to prevent decomposition of the ammonium nitrite and vent gas comprising mist exits from said scrubbing reactor;

(c) maintaining the temperature of said vent gas at less than about 40° C.; and (d) removing said mist from said vent gas.

2. The process of claim 1 wherein said manufacturing stream comprises nitric acid.

3. The process of claim, 1 wherein said manufacturing stream comprises hydroxylamine disulfonate diammonium salt.

4. The process of claim 1 wherein said hydroxylamine disulfonate diammonium salt is formed from the reaction of ammonium nitrite and sulfur dioxide.

5. The process of claim 1 wherein in said step (b), at least about 60 weight percent said $NO_x$ forms said ammonium nitrite.

6. The process of claim 1 wherein in said step (b), at least about 70 weight percent said $NO_x$ forms said ammonium nitrite.

7. The process of claim 1 wherein said formed ammonium nitrite is recovered.

8. The process of claim 1 wherein in said step (b), said temperature is less than or equal to about 35° C.

9. The process of claim 1 wherein in said step (b), said temperature is less than or equal to about 30° C.

10. The process of claim 1 wherein in said step (b), said pH is greater than or equal to about 8.0.

11. The process of claim 1 wherein in said step (b), said pH is greater than or equal to about 8.5.

12. The process of claim 1 wherein said step (d) comprises using a mist removal unit having candle style mist removal elements wherein said elements are irrigated with said alkali solution.

13. The process of claim 1 wherein in said step (b), said alkali solution is selected from the group consisting of ammonium carbonate and ammonium bicarbonate.

* * * * *

UNITED STATES PATENT AND TRADEMARK OFFICE
CERTIFICATE OF CORRECTION

PATENT NO. : 6,004,523
DATED : December 21, 1999
INVENTOR(S) : Weber et al.

It is certified that error appears in the above-identified patent and that said Letters Patent is hereby corrected as shown below:

Col. 7, line 29, insert --about-- between "to" and "2:1"

Signed and Sealed this

Nineteenth Day of September, 2000

Attest:

Q. TODD DICKINSON

Attesting Officer

Director of Patents and Trademarks